(12) United States Patent
Mendelovich et al.

(10) Patent No.: US 7,970,672 B2
(45) Date of Patent: Jun. 28, 2011

(54) REAL-TIME MARKETING OF CREDIT-BASED GOODS OR SERVICES

(75) Inventors: Michael S. Mendelovich, Menlo Park, CA (US); Richard Rodenbusch, Allen, TX (US); Jb G. Orecchia, Pleasanton, CA (US)

(73) Assignee: Metareward, Inc., San Carlos, CA (US)

( * ) Notice: Subject to any disclaimer, the term of this patent is extended or adjusted under 35 U.S.C. 154(b) by 720 days.

(21) Appl. No.: 11/219,142

(22) Filed: Sep. 1, 2005

(65) Prior Publication Data

US 2006/0080233 A1   Apr. 13, 2006

Related U.S. Application Data

(60) Provisional application No. 60/606,630, filed on Sep. 1, 2004.

(51) Int. Cl.
*G06Q 40/00* (2006.01)

(52) U.S. Cl. .............................................. 705/35; 705/38

(58) Field of Classification Search ........................ None
See application file for complete search history.

(56) References Cited

U.S. PATENT DOCUMENTS

| | | | |
|---|---|---|---|
| 5,819,234 A | 10/1998 | Slavin et al. | |
| 5,822,410 A | 10/1998 | McCausland et al. | |
| 5,870,721 A | 2/1999 | Norris | |
| 5,878,403 A | 3/1999 | DeFrancesco et al. | |
| 5,907,828 A | 5/1999 | Meyer et al. | |
| 5,924,082 A | 7/1999 | Silverman et al. | |
| 5,930,776 A | 7/1999 | Dykstra et al. | |
| 5,940,812 A | 8/1999 | Tengel et al. | |
| 5,966,699 A | 10/1999 | Zandi | |
| 5,970,478 A | 10/1999 | Walker et al. | |
| 5,995,947 A | 11/1999 | Fraser et al. | |
| 6,029,149 A | 2/2000 | Dykstra et al. | |
| 6,088,686 A | 7/2000 | Walker et al. | |
| 6,129,273 A | 10/2000 | Shah | |
| 6,144,948 A | 11/2000 | Walker et al. | |
| 6,158,657 A * | 12/2000 | Hall et al. ...................... | 235/380 |
| 6,185,543 B1 | 2/2001 | Galperin et al. | |
| 6,374,230 B1 | 4/2002 | Walker et al. | |
| 6,385,594 B1 | 5/2002 | Lebda et al. | |

(Continued)

FOREIGN PATENT DOCUMENTS

EP    1 028 401 A2    8/2000

OTHER PUBLICATIONS

PR Newswire, Experian's Veriscore Delivers Increased Customer Acquisition and Investment Returns for Top financial Institutions, New York: Jul 28, 2004.*

(Continued)

*Primary Examiner* — Rajesh Khattar
*Assistant Examiner* — Carol See
(74) *Attorney, Agent, or Firm* — Knobbe, Martens, Olson & Bear, LLP

(57) ABSTRACT

Systems and methods are described that determine which offers for credit-based transactions (if any) to market to a person. Each offer is associated with a set of third party demographic information criteria, a set of lender demographic information criteria, and a set of lender credit data criteria. The set of third party demographic information criteria is applied to a set of offers to determine a first subset of offers. The set of lender demographic information criteria is applied to the first subset of offers to determine a second subset of offers. The set of lender credit data criteria is applied to the second subset of offers to determine a third subset of offers.

12 Claims, 18 Drawing Sheets

U.S. PATENT DOCUMENTS

| | | | |
|---|---|---|---|
| 6,405,181 B2* | 6/2002 | Lent et al. | 705/38 |
| 6,611,816 B2 | 8/2003 | Lebda et al. | |
| 6,640,215 B1 | 10/2003 | Galperin et al. | |
| 7,178,720 B1 | 2/2007 | Strubbe et al. | |
| 7,379,913 B2* | 5/2008 | Steele et al. | 705/38 |
| 2002/0040339 A1* | 4/2002 | Dhar et al. | 705/38 |
| 2002/0072975 A1* | 6/2002 | Steele et al. | 705/14 |
| 2002/0077964 A1* | 6/2002 | Brody et al. | 705/38 |
| 2002/0099641 A1 | 7/2002 | Mills et al. | |
| 2002/0194103 A1* | 12/2002 | Nabe | 705/37 |
| 2003/0078877 A1 | 4/2003 | Beirne et al. | |
| 2003/0144907 A1* | 7/2003 | Cohen et al. | 705/14 |
| 2003/0208412 A1* | 11/2003 | Hillestad et al. | 705/26 |
| 2004/0054619 A1 | 3/2004 | Watson et al. | |
| 2004/0064402 A1 | 4/2004 | Dreyer et al. | |
| 2004/0215556 A1 | 10/2004 | Merkley, Jr. et al. | |
| 2005/0065874 A1 | 3/2005 | Lefner et al. | |
| 2005/0159993 A1* | 7/2005 | Kordas et al. | 705/10 |
| 2005/0187860 A1 | 8/2005 | Peterson et al. | |
| 2005/0209922 A1 | 9/2005 | Hofmeister | |
| 2005/0228748 A1 | 10/2005 | Togher et al. | |
| 2006/0080233 A1 | 4/2006 | Mendelovich et al. | |
| 2006/0080251 A1 | 4/2006 | Fried et al. | |
| 2006/0095363 A1 | 5/2006 | May | |
| 2006/0100954 A1 | 5/2006 | Schoen | |
| 2006/0155639 A1 | 7/2006 | Lynch et al. | |
| 2006/0173772 A1 | 8/2006 | Hayes et al. | |
| 2006/0178983 A1 | 8/2006 | Nice et al. | |
| 2008/0059317 A1 | 3/2008 | Chandran et al. | |
| 2008/0059352 A1 | 3/2008 | Chandran | |

OTHER PUBLICATIONS

Business Wire, New Fair Isaac Qualify Score Helps Businesses Reduce Customer Acquisition Costs and Expand Marketing Oportunities, New York: Jun 21, 2004.*

Experian Information Solutions, Inc., "Instant Prescreen", 2000 [online] [retrieved on Aug. 11, 2005] Retrieved from the internet <URL: http://www.cdillinois.com/pdf$_{13}$ file/instant_prescreen_ps.pdf>.

Experian Global Press Office, "Experian Enables Profitable e-Business", 2000 [online] [retrieved on Aug. 11, 2005] Retrieved from the internet <URL: http://press.experian.com/popup/sd.cfm?f=43.htm>.

Experian Global Press Office, "Experian Announces Innovative e-Commerce Technology Enhancement", 2001 [online] [retrieved on Aug. 11, 2005] Retrieved from the internet <URL: http://press.experian.com/popup/sd.cfm?f=280.htm>.

Experian Information Solutions, Inc., "Enabling e-business", 2001 [online] [retrieved on Aug. 11, 2005] Retrieved from the internet <URL: http://press.experian.com/documents/enablingebusiness.pdf>.

Fairlsaac, "Case Study: Expanding to Non-Traditional Prescreen Marketing Channels Reduces Company's Cost Per Account Booked", 2003 [online] [retrieved on Sep. 1, 2005] Retrieved from the internet <URL: http://www.fairisaac.com/NR/rdonlyres/048FAE87-14B5-4732-970D-BDF20F09EB2D/0/MSDSRealTimeCS.pdf>.

Office Action dated Dec. 16, 2008 in co-pending U.S. Appl. No. 11/537,330.

Office Action dated Sep. 8, 2009 in co-pending U.S. Appl. No. 11/537,330.

Office Action dated Oct. 10, 2008 in co-pending U.S. Appl. No. 11/848,138.

Office Action dated Sep. 25, 2009 in co-pending U.S. Appl. No. 11/848,138.

Office Action dated Feb. 4, 2010 in co-pending U.S. Appl. No. 11/848,138.

* cited by examiner

REAL-TIME MARKETING OF CREDIT-BASED GOODS OR SERVICES

CROSS-REFERENCE TO RELATED APPLICATION

This patent application claims priority from the following provisional patent application, which is hereby incorporated by reference: U.S. Patent Application Ser. No. 60/606,630, filed on Sep. 1, 2004, entitled "System and Method for Real-Time On-Line Pre-Screening of Applicants for Credit."

FIELD OF THE INVENTION

This invention relates generally to marketing credit-based goods or services and, more specifically, to determining which credit-based goods or services (if any) to market to a person.

BACKGROUND OF THE INVENTION

In the past, each credit card was marketed to everyone in the same way, using the same application documents and offering the same terms. Since many recipients ignored the applications or applied and were denied, the credit issuers had to send out hundreds, or even thousands, of applications at a time in order to generate a few new customers. Also, many recipients who intended to apply abandoned the process at some point between receiving their offers (applications) and actually receiving their cards.

In order to save money, the credit issuers began to use demographic information to target their mailings toward people it expected to be profitable (for example, people who would respond and/or people whose applications would be approved). The issuers also created multiple credit cards, which differed in their terms or associated fringe benefits and which could be marketed to different people. These targeted marketing techniques resulted in a higher yield in terms of both response rate and approval rate.

However, offer recipients were still reluctant to apply, since they didn't want to spend time filling out applications only to be denied later on. In response, the issuers began prescreening people for credit card offers. The issuers would obtain a person's credit data and determine whether it met their lending criteria. If it did, the person would be pre-approved, and the offer that she received would so indicate. Thus, a recipient could distinguish between an offer that had been prescreened and one that had not (commonly referred to as an invitation to apply or "ITA"). While prescreening increases the yield, it is used sparingly due to the cost of obtaining data from credit bureaus.

Another advance in credit card marketing is a decrease in the time it takes to review an application and render a decision of approval or denial. Initially, paper applications submitted by mail, and decisions were made in a matter of weeks or months. Then, applications were submitted electronically, and decisions were made in days or weeks. Now, information systems and technology have advanced to the point where a credit decision can be made in a matter of minutes or even seconds.

This real-time decisioning means that a customer can apply for credit and receive an answer almost instantly. "Instant credit decisioning" has been used in various situations, including at a point-of-sale (POS) or at a credit issuer's web site. In an effort to reach a wider audience, issuers have also partnered with third-party web sites to cross-sell their credit products. These websites can monitor their users in real-time and present offers to them according to their characteristics.

As this type of cross-selling becomes more common, several issues will arise. One is how to handle multiple offers, each of which can be presented to the user. Another is whether to prescreen a user in an attempt to present a pre-approved offer. How these issues are resolved will determine whether these cross-selling partnerships make financial sense for both the credit issuers and the third-party web sites.

What is needed are a method and a system that can determine which credit-based goods or services (if any) to market to a person.

SUMMARY OF THE INVENTION

Systems and methods are described that determine which offers for credit-based transactions (if any) to market to a person. In one embodiment, each offer is associated with a set of third party demographic information criteria, a set of lender demographic information criteria, and a set of lender credit data criteria. The set of third party demographic information criteria is applied to a set of offers to determine a first subset of offers. The set of lender demographic information criteria is applied to the first subset of offers to determine a second subset of offers. The set of lender credit data criteria is applied to the second subset of offers to determine a third subset of offers. In one embodiment, offers in the final subset (e.g., the third subset) are ranked based on characteristics such as profitability, response rate, and booked rate.

In one embodiment, the sets of criteria are used in a different order. For example, the set of lender demographic information criteria is applied to the set of offers to determine a first subset of offers, and the set of third party demographic information criteria is applied to the first subset of offers to determine a second subset of offers. In another embodiment, different sets of criteria are used. For example, third party demographic information criteria is not used or lender demographic information criteria is not used.

Figure 1:
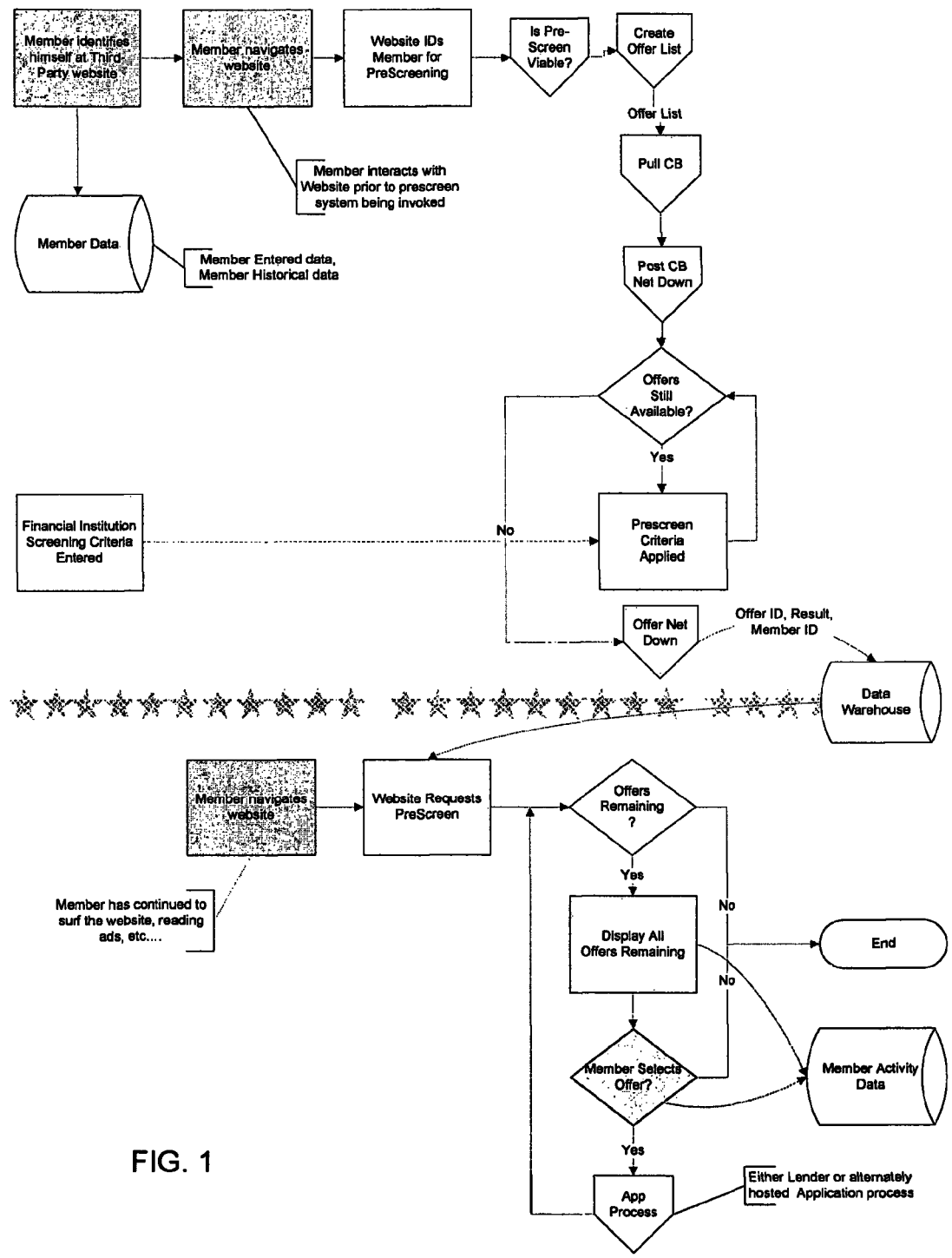
FIG. 1 is a flow chart of a method of operation for a third party server using a credit card marketing system, according to one embodiment of the invention.

The figures depict embodiments of the present invention for purposes of illustration only. One skilled in the art will readily recognize from the following discussion that alternative embodiments of the structures and methods illustrated herein can be employed without departing from the principles of the invention described herein.

DETAILED DESCRIPTIONS OF THE EMBODIMENTS

Many types of financial transactions include one party giving something of value to another in anticipation of receiving one or more payments in the future. These types of financial transactions will collectively be called "credit-based transactions." One type of credit-based transaction involves delayed or installment payments. Delayed or installment payments are commonly used for, for example, homes (e.g., mortgage loans), cars (car loans), credit card balances, furniture, and appliances. Another type involves recurring payments. Recurring payments are commonly used for, for example, utilities (e.g., electricity, gas, and landline telephones), electronic services (e.g., cable or satellite television, internet access, and cellular telephones), club memberships (e.g., health clubs, music clubs, and movie rental clubs), and insurance (e.g., life, health, automobile, and home).

If a person wants to pay for something expensive using a credit-based transaction, the seller will likely want to determine, ahead of time, whether the person can complete the future payment(s). The most accurate way to do this is by reviewing the person's credit data and/or credit score (which is based on the credit data). Credit data can include, for example, personal information (such as a value of a major asset), credit information (such as account balance), public record information (such as bankruptcy), and inquiry information (such as a request for a credit report). Along these lines, the phrase "credit-based transaction" will also indicate that a seller will review an applicant's credit data before making a credit decision.

While the invention can be used in conjunction with offers for any type of credit-based transaction, the embodiments described below address offers for credit cards in particular. Specifically, systems and methods for determining which credit cards (if any) to market to a person are described.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages can be used to implement the teachings of the invention as described herein.

Overview

Since credit data will eventually be used to make a credit decision for a credit-based transaction, it follows that the same data would be helpful when marketing the underlying goods or services. However, since obtaining credit data can be costly, some sellers settle for marketing based on demographic information and/or any information previously obtained. These types of information are cheaper, but less accurate in terms of targeting key prospects. For example, in order to save money, a seller can use demographic information to reduce his initial list of prospects. Afterwards, if desired, the seller can use credit data to filter the list further. Rules and restrictions used to filter a list are called "eligibility criteria."

Whether and how to filter a list of prospects depends on the associated costs and benefits. If a list is not filtered, then more offers will be made, and more applications will be returned (including applications that will be denied because they do not meet the eligibility criteria). The costs associated with not filtering a list can include presenting more offers, processing more applications, and risking annoying more recipients. In traditional (paper-based) marketing, presenting more offers corresponds to paper and mailing costs, while in web-based marketing, it corresponds to screen real estate and user response/download time. In paper-based marketing, annoyance can result in the recipient "boycotting" the sender, while in web-based marketing, annoyance can also result in the person abandoning (leaving) the web site. If the offer is presented by a third-party web site in the middle of another transaction (e.g., while the recipient is signing up for a mailing list), then abandonment will prevent completion of the initial transaction, which imposes an additional cost on the beneficiary of the interrupted transaction.

The benefits associated with not filtering a list can include everyone receiving the offer and having a chance to respond to it. Whenever a list is filtered, it is possible that someone will be removed who would have responded to the offer and been approved. Not filtering the list prevents this from happening.

If, on the other hand, a list is filtered, then fewer offers will be made, but the applications that are returned will be more likely to meet the eligibility criteria. The costs associated with filtering a list can include obtaining the information to filter on and performing the filtering. Both demographic information and credit data can be obtained from various sources for a fee. It is generally cheaper to filter a list based on demographic information than on credit data, since demographic information is cheaper and it can be used for multiple people, while credit data is more expensive and can be used for only one person. In non-real-time marketing, filtering can be performed for a fee. In real-time marketing, filtering not only costs money directly, but can also affect user response/download time, potentially causing the user to abandon the web site.

The benefits associated with filtering a list can include a higher yield, in terms of both response rate and acceptance rate. In general, filtering based on credit data will result in a higher yield than filtering based on demographic data.

System

In one embodiment, a credit card marketing system determines which credit cards (if any) to market to a person (a "Member"). In one embodiment, a third party uses the system to determine which credit cards (if any) to market on behalf of one or more credit card issuers ("Financial Institutions" or "Lenders").

In one embodiment, the third party maintains a web site that attracts users (Members) for reasons related to credit card offers. For example, the web site can offer various financial services, including credit cards. While the Member is at the website, the third party uses the credit card marketing system to determine which credit cards (if any) to market to him. The third party can then market the determined credit cards (if any).

In another embodiment, the third party maintains a web site that attracts users (Members) for reasons unrelated to credit card offers. For example, the third party's website enables a Member to sign up for a mailing list of interest. While the Member is at the website, the third party uses the credit card marketing system to determine which credit cards (if any) to market to him. The third party can then market the determined credit cards (if any).

FIG. 1 is a flow chart of a method of operation for a third party server using a credit card marketing system, according to one embodiment of the invention. "CB" stands for "credit bureau."

Figure 2:
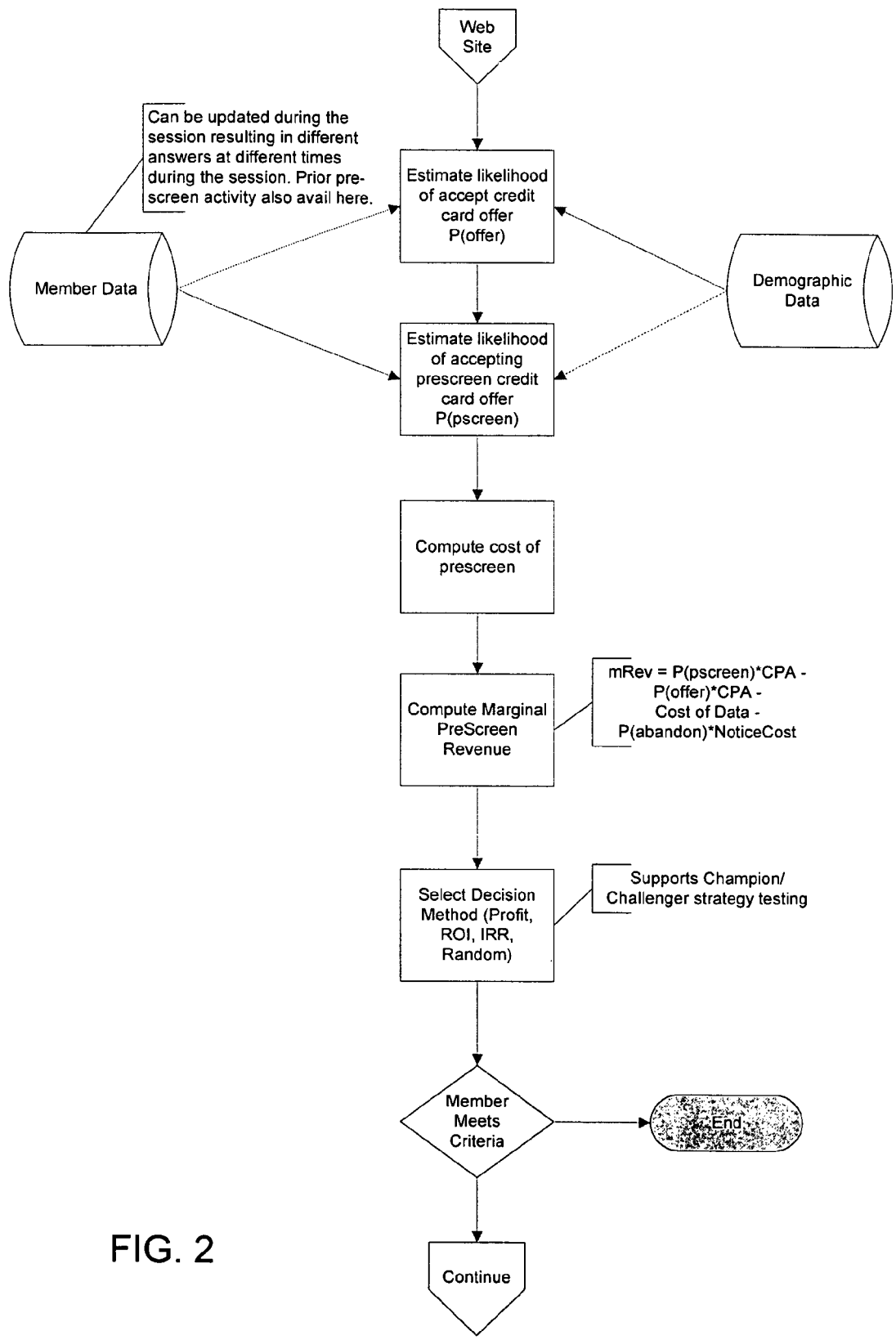
FIG. 2 is a flow chart that shows the "Is Pre-Screen Viable?" step of FIG. 1 in more detail, according to one embodiment of the invention.

FIG. 2 is a flow chart that shows the "Is Pre-Screen Viable?" step of FIG. 1 in more detail, according to one embodiment of the invention. "P(offer)" represents the probability that the user will accept any credit card offer. "P(pscreen)" represents the probability that the user will accept any prescreened credit card offer. "mRev" stands for "marginal prescreen revenue," which represents the overall profitability of the user to the third party. "CPA" stands for "cost per acquisition," which is the amount of money that the third party receives if the user applies for the credit card and his application is accepted. "P(abandon)" represents the probability that the user will abandon the third party website if offered a credit card. "ROI" stands for "return on investment." "IRR" stands for "internal rate of return."

Figure 3:
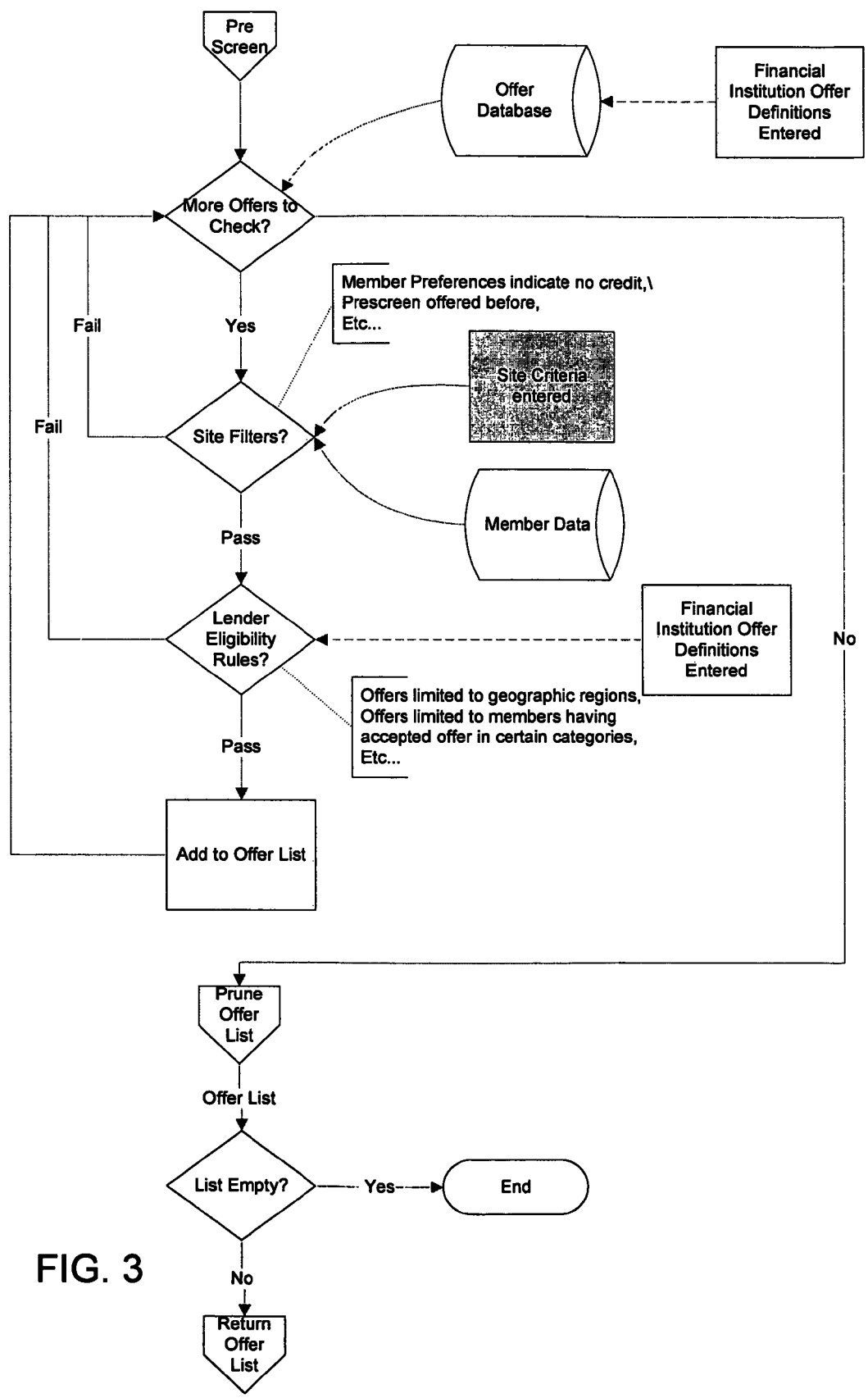
FIG. 3 is a flow chart that shows the "Create Offer List" step of FIG. 1 in more detail, according to one embodiment of the invention.

FIG. 3 is a flow chart that shows the "Create Offer List" step of FIG. 1 in more detail, according to one embodiment of the invention.

Figure 4:
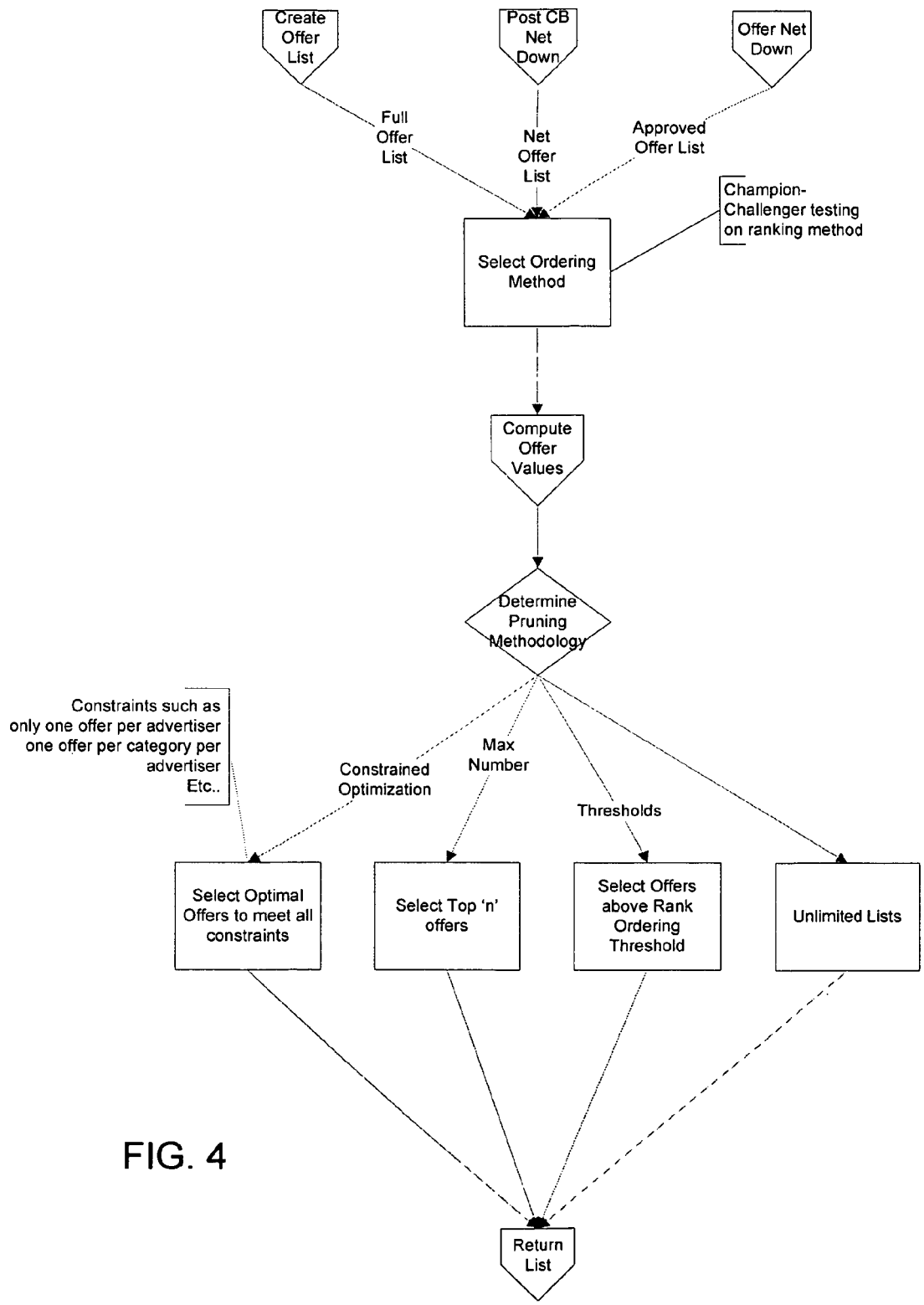
FIG. 4 is a flow chart that shows the "Prune Offer List" step of FIG. 3 in more detail, according to one embodiment of the invention.

FIG. 4 is a flow chart that shows the "Prune Offer List" step of FIG. 3 in more detail, according to one embodiment of the invention. This Prune Offer List step is also present in FIG. 7 ("Prune Offer list"). In addition, the "Offer Net Down" step in FIG. 1 also refers to the Prune Offer List step shown in FIG. 4.

Figure 5:
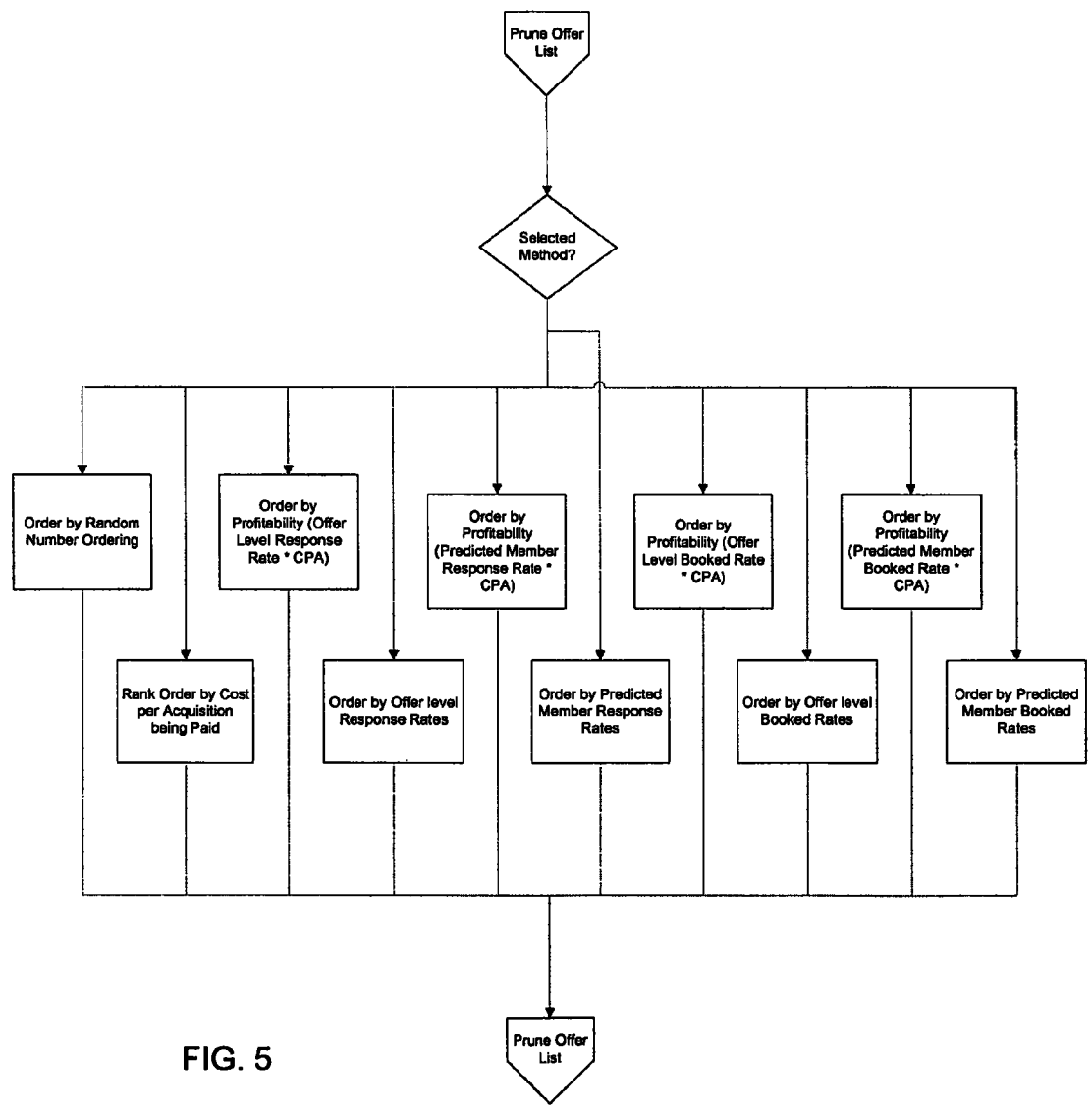
FIG. 5 is a flow chart that shows the "Compute Offer Values" step of FIG. 4 in more detail, according to one embodiment of the invention.

FIG. 5 is a flow chart that shows the "Compute Offer Values" step of FIG. 4 in more detail, according to one embodiment of the invention. A random ordering method ("Order by Random Number Ordering") supports even representation between offers. If the pruning methodology is set to a maximum of one offer ("Select Top 'n' offers", where n equals one), then random ordering results in a "rotational" single offering. In other words, the Prune Offer List step shown in FIG. 4 will determine one offer, and this offer will vary randomly among a set of input offers (e.g., Full Offer List, Net Offer List, or Approved Offer List).

Figure 6:
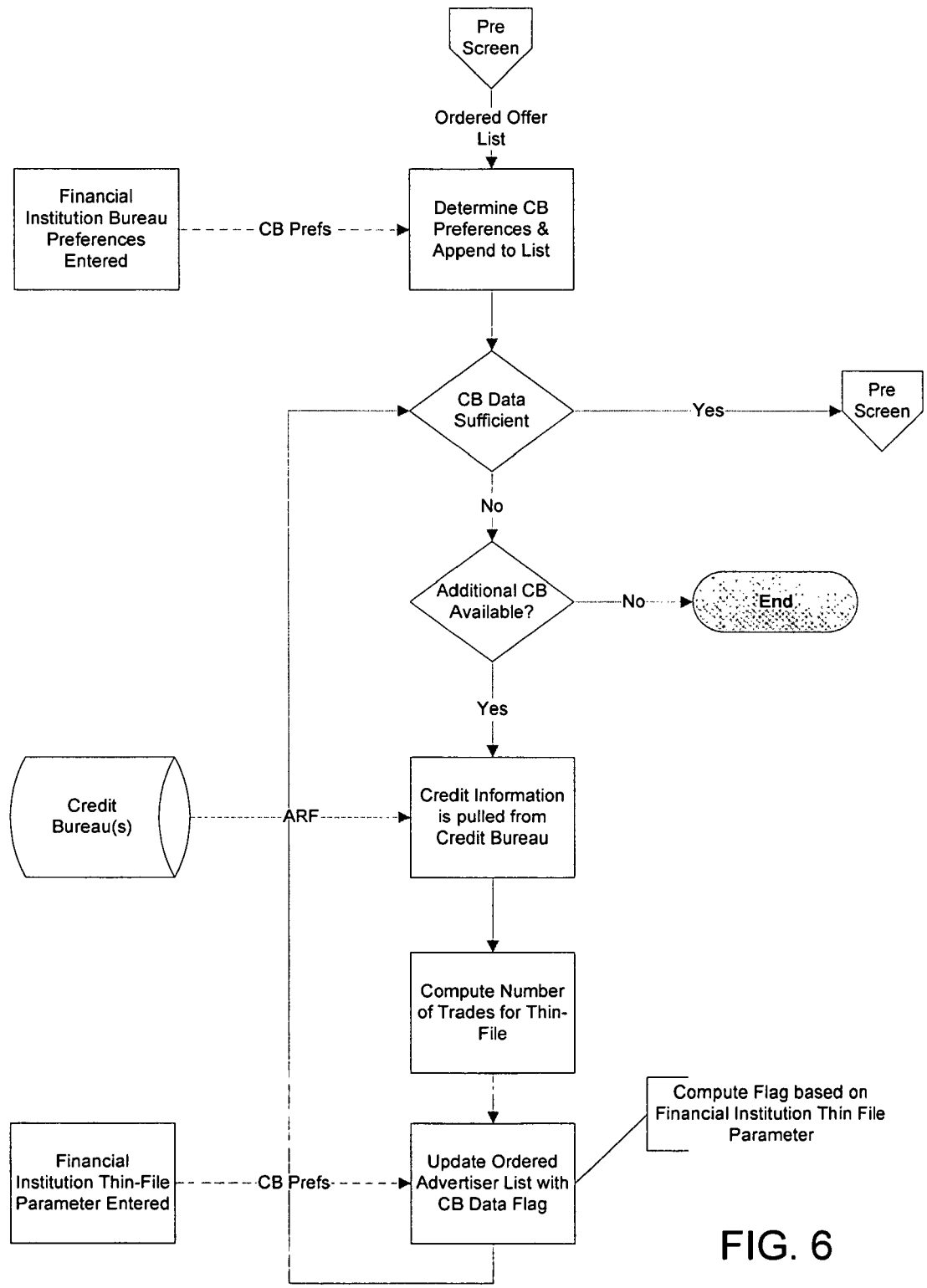
FIG. 6 is a flow chart that shows the "Pull CB" step of FIG. 1 in more detail, according to one embodiment of the invention.

FIG. 6 is a flow chart that shows the "Pull CB" step of FIG. 1 in more detail, according to one embodiment of the invention. "ARF" stands for "Automated Response File" (here, a machine-readable version of a credit report). A "thin-file" is a credit report that contains a small (possibly insufficient) amount of credit data.

Figure 7:
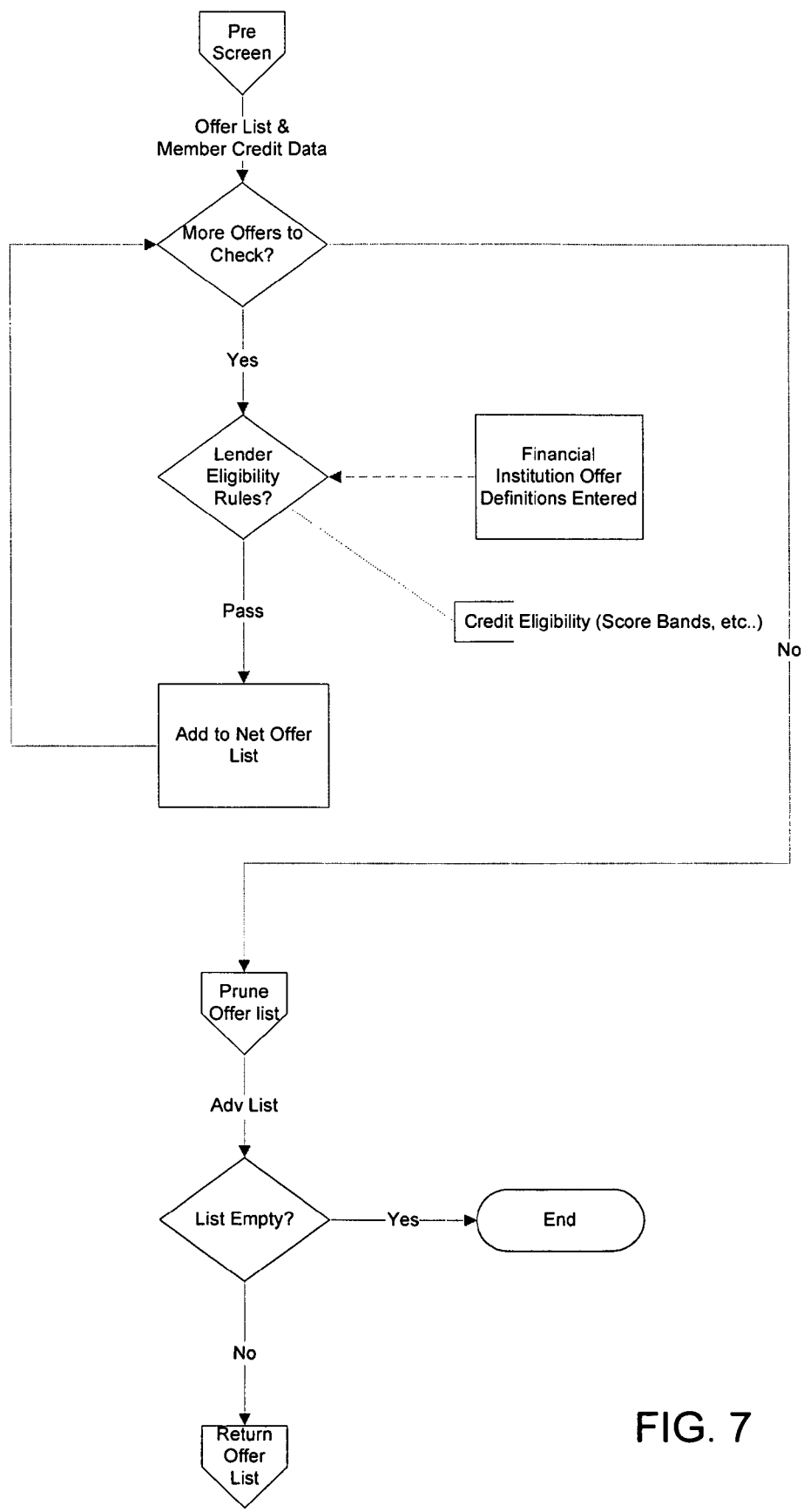
FIG. 7 is a flow chart that shows the "Post CB Net Down" step of FIG. 1 in more detail, according to one embodiment of the invention.

FIG. 7 is a flow chart that shows the "Post CB Net Down" step of FIG. 1 in more detail, according to one embodiment of the invention. A "score band" is a range of scores.

Figure 8:
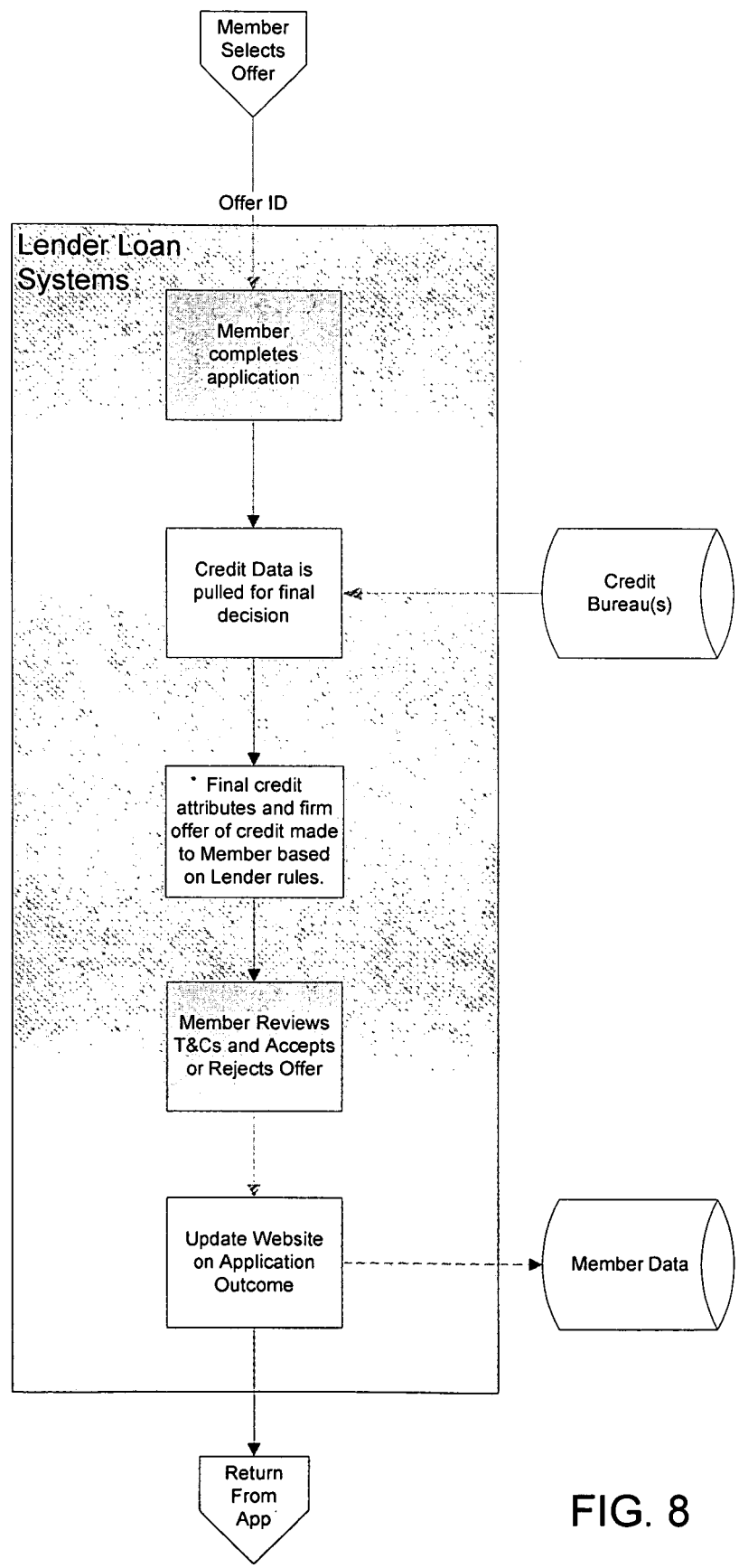
FIG. 8 is a flow chart that shows the "App Process" step of FIG. 1 in more detail, according to one embodiment of the invention.

FIG. 8 is a flow chart that shows the "App Process" step of FIG. 1 in more detail, according to one embodiment of the invention. "T&Cs" stands for "terms and conditions."

Figure 9:
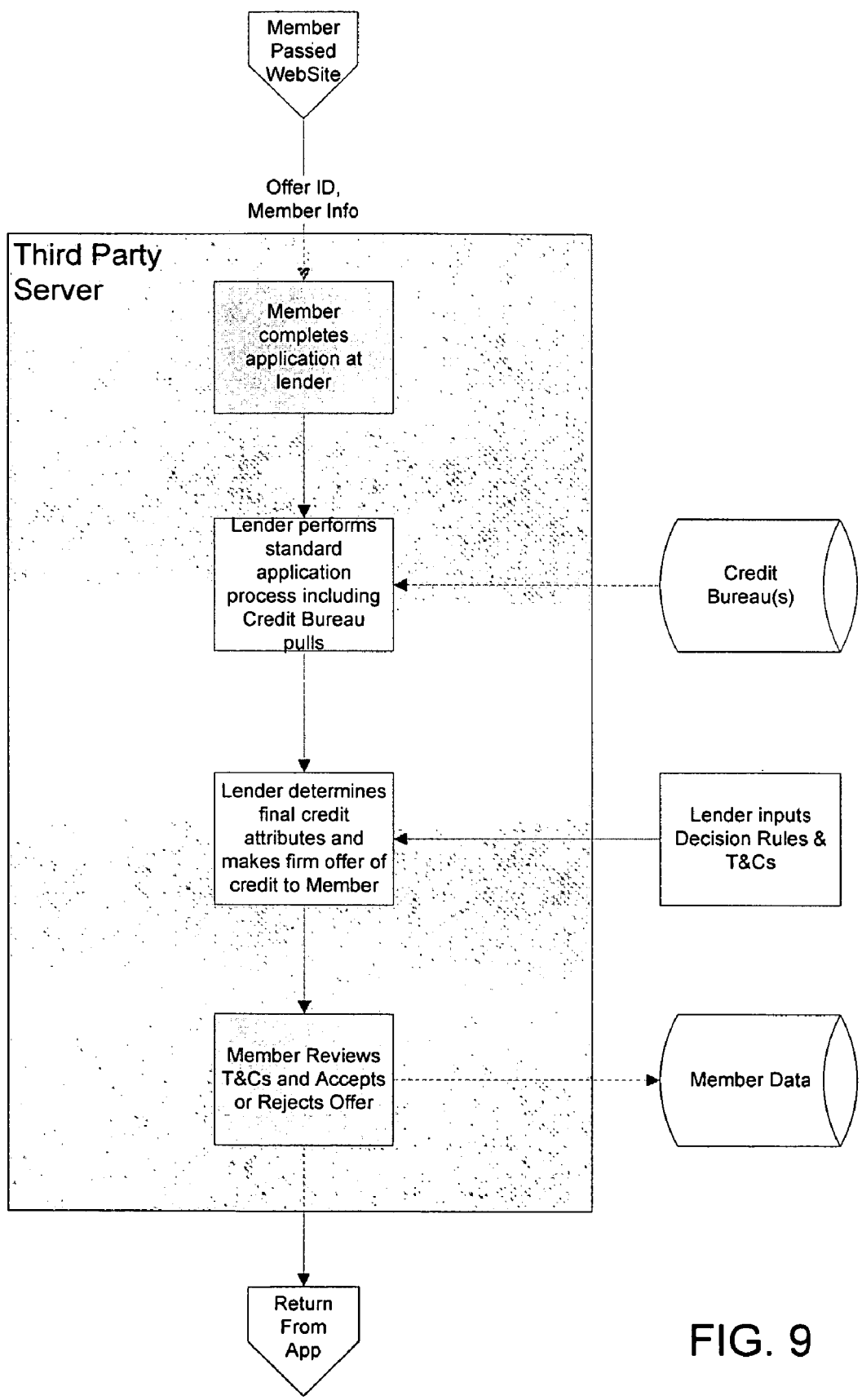
FIG. 9 is a flow chart that shows the "App Process" step of FIG. 1 in more detail, according to another embodiment of the invention.

FIG. 9 is a flow chart that shows the "App Process" step of FIG. 1 in more detail, according to another embodiment of the invention.

Figure 10:
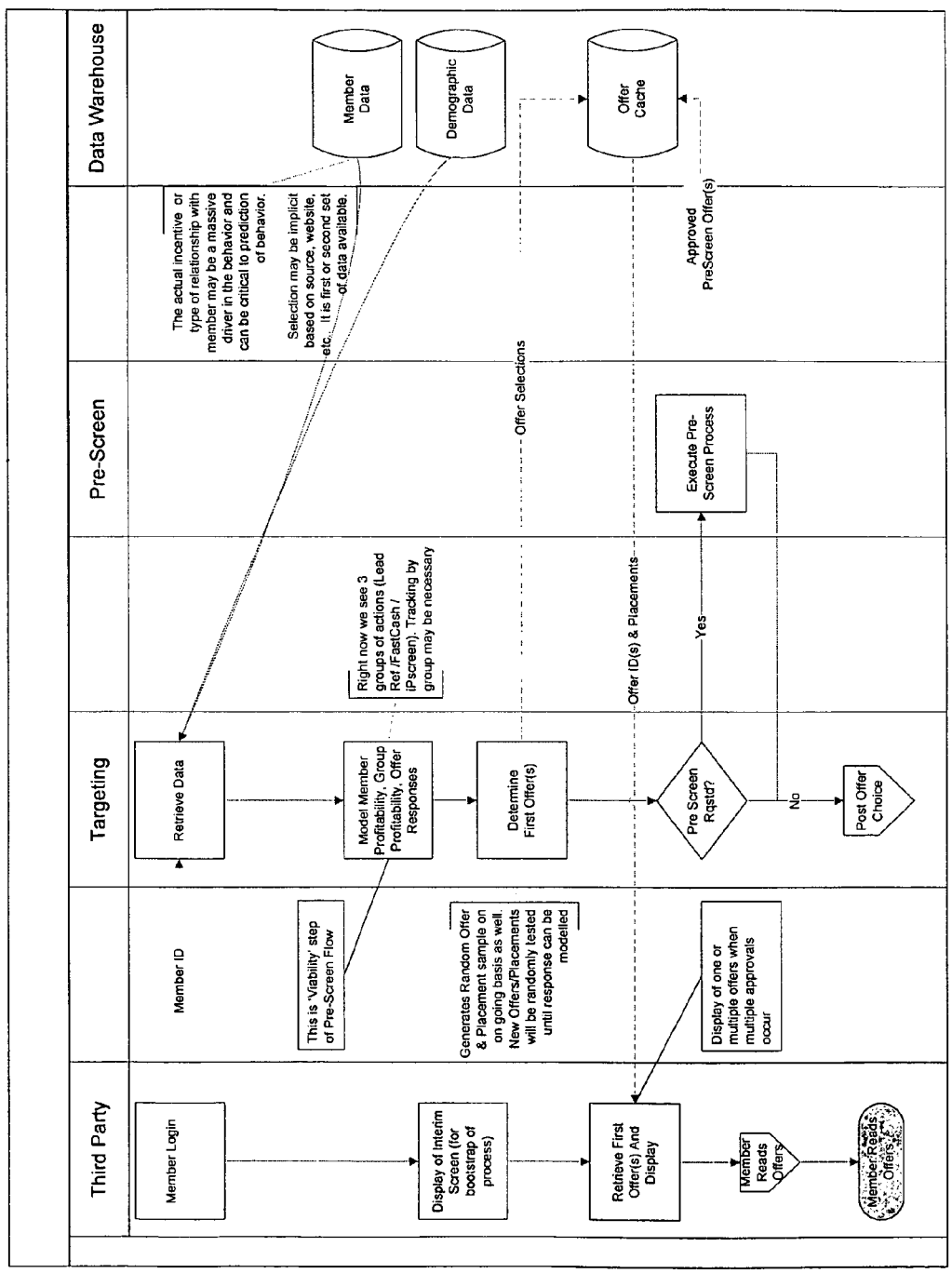
FIG. 10 is an activity diagram that shows a first step of a member login process, according to one embodiment of the invention.

FIG. 10 is an activity diagram that shows a first step of a member login process, according to one embodiment of the invention. In one embodiment, the Targeting swimlane and the Pre-Screen swimlane are executed by credit bureaus or agents of credit bureaus. The symbol "π" represents profitability.

Figure 11:
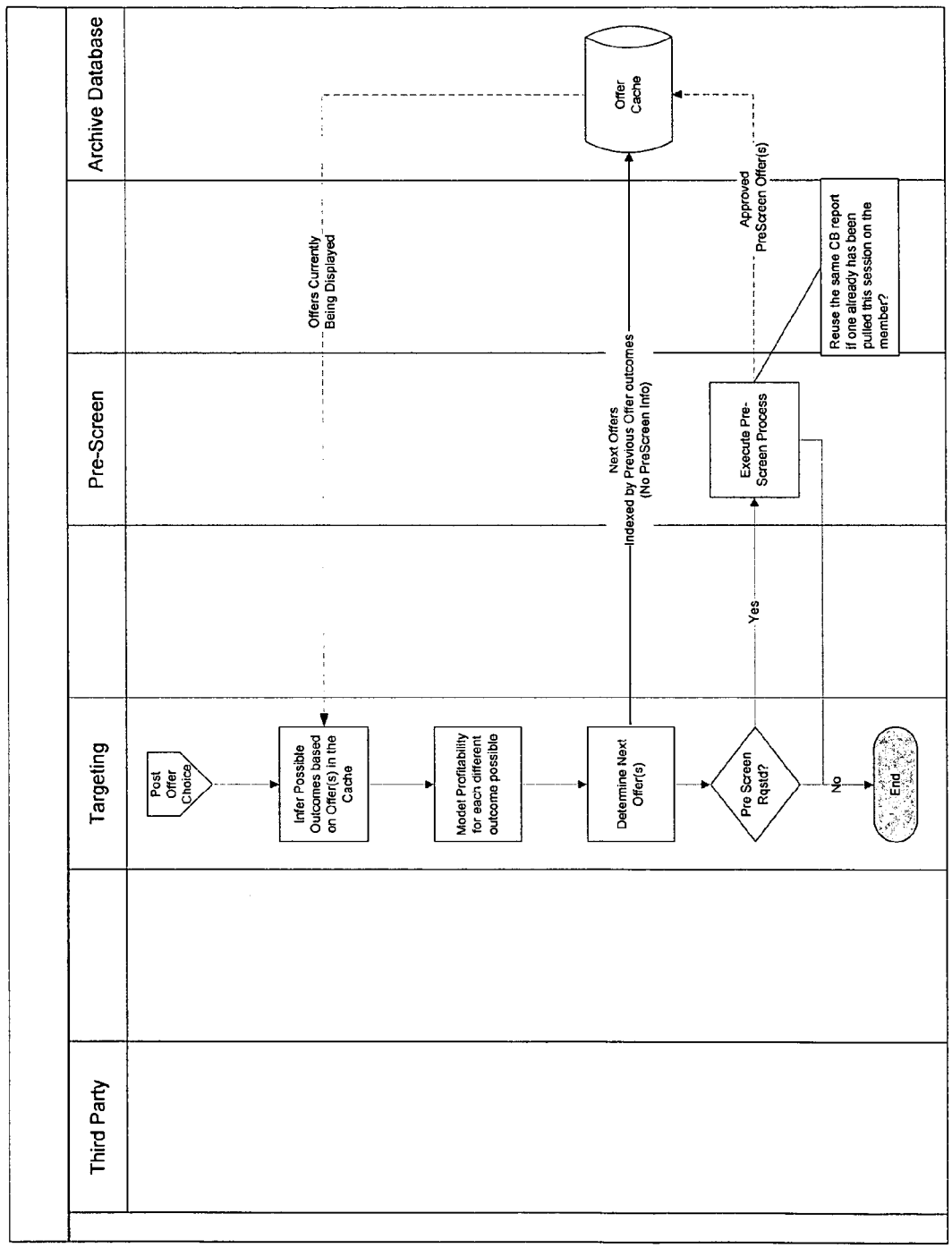
FIG. 11 is an activity diagram that shows a second step of the member login process, according to one embodiment of the invention.

FIG. 11 is an activity diagram that shows a second step of the member login process, according to one embodiment of the invention.

Figure 12:
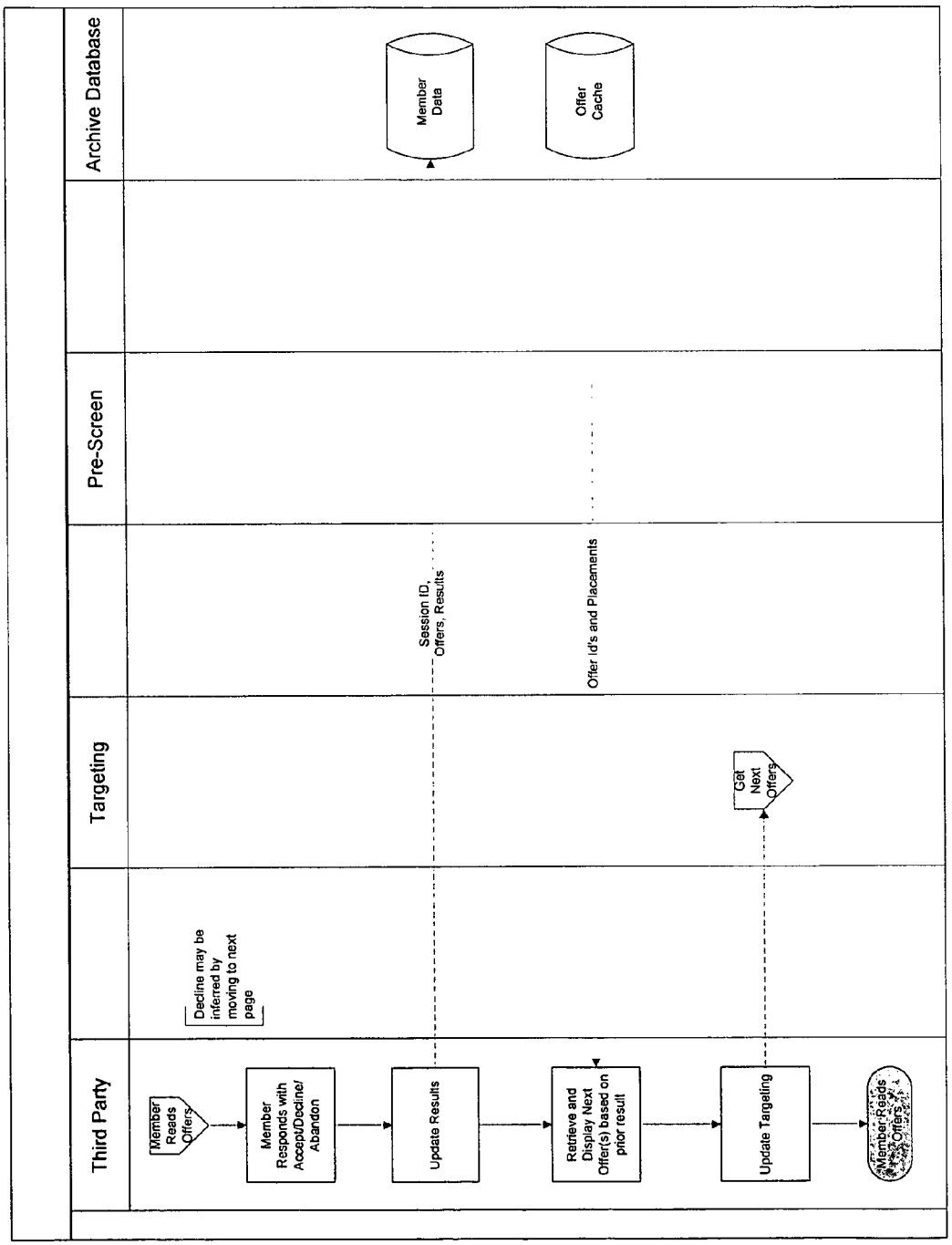
FIG. 12 is an activity diagram that shows the "Member Reads Offers" step of FIG. 10 in more detail, according to one embodiment of the invention.

FIG. 12 is an activity diagram that shows the "Member Reads Offers" step of FIG. 10 in more detail, according to one embodiment of the invention.

Figure 13:
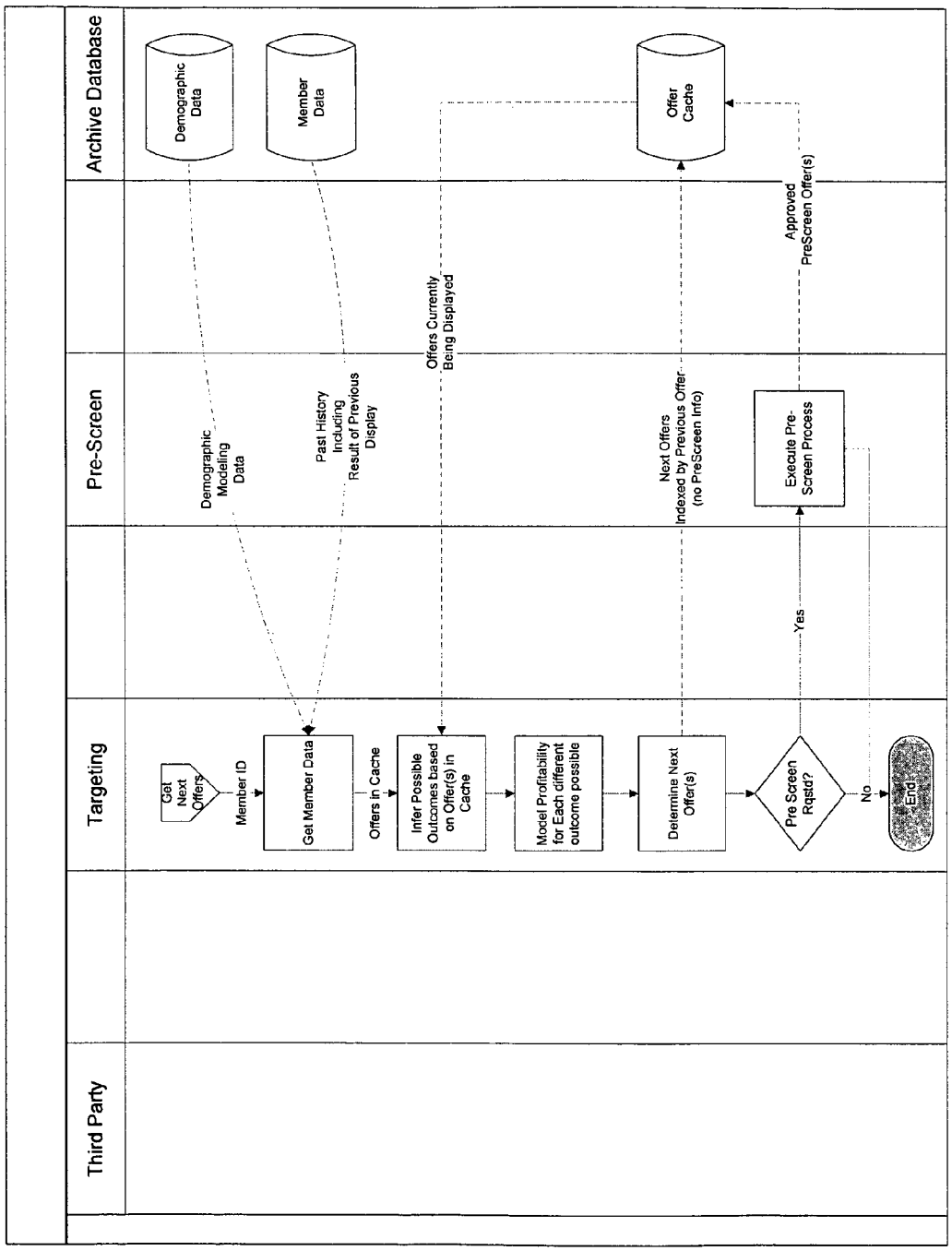
FIG. 13 is an activity diagram that shows the "Get Next Offers" step of FIG. 12 in more detail, according to one embodiment of the invention.

FIG. 13 is an activity diagram that shows the "Get Next Offers" step of FIG. 12 in more detail, according to one embodiment of the invention.

Figure 14:
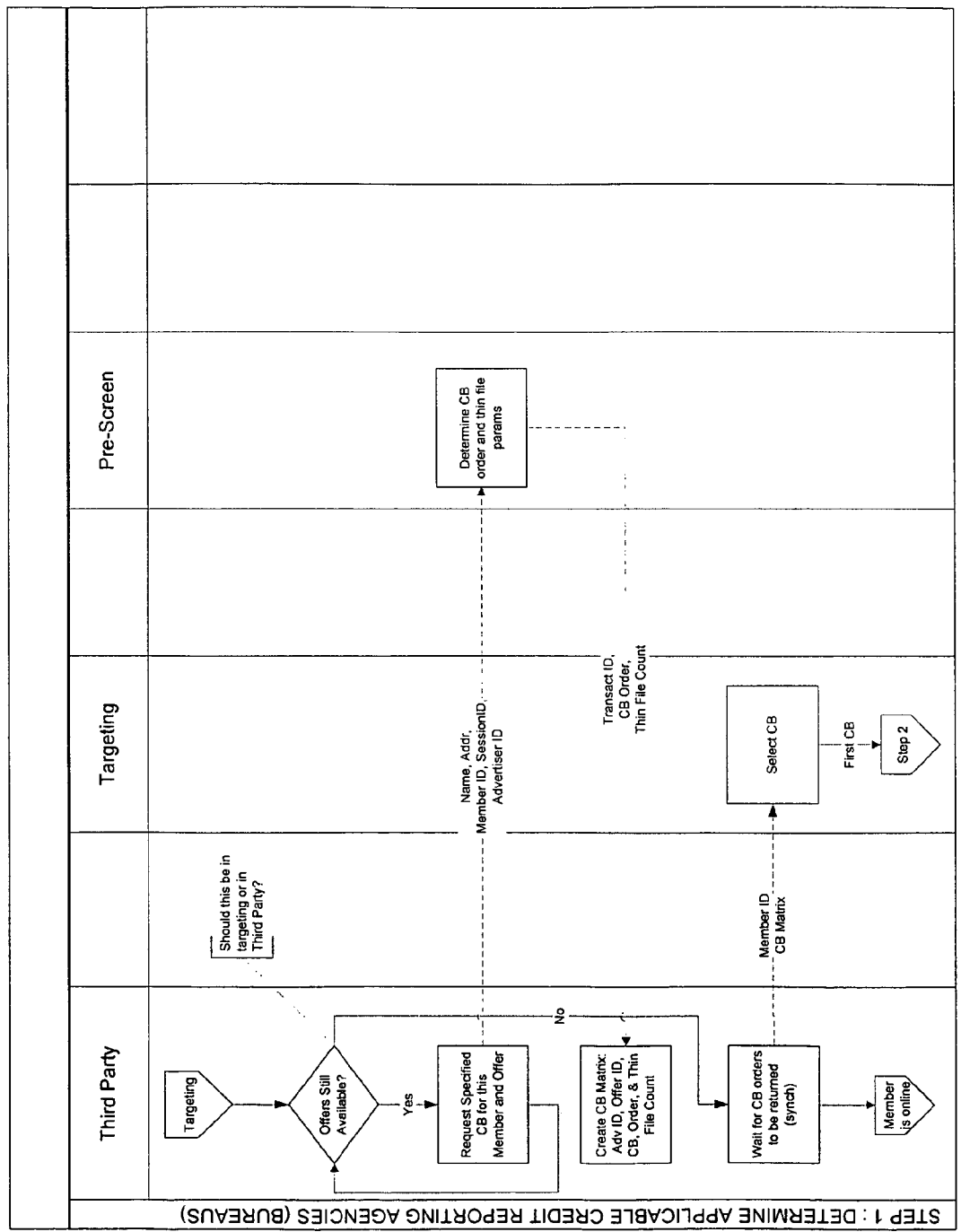
FIG. 14 is an activity diagram that shows a first step of a prescreen process, according to one embodiment of the invention.

FIG. 14 is an activity diagram that shows a first step of a prescreen process, according to one embodiment of the invention. In one embodiment, the Targeting swimlane and the Pre-Screen swimlane are executed by credit bureaus or agents of credit bureaus.

Figure 15:
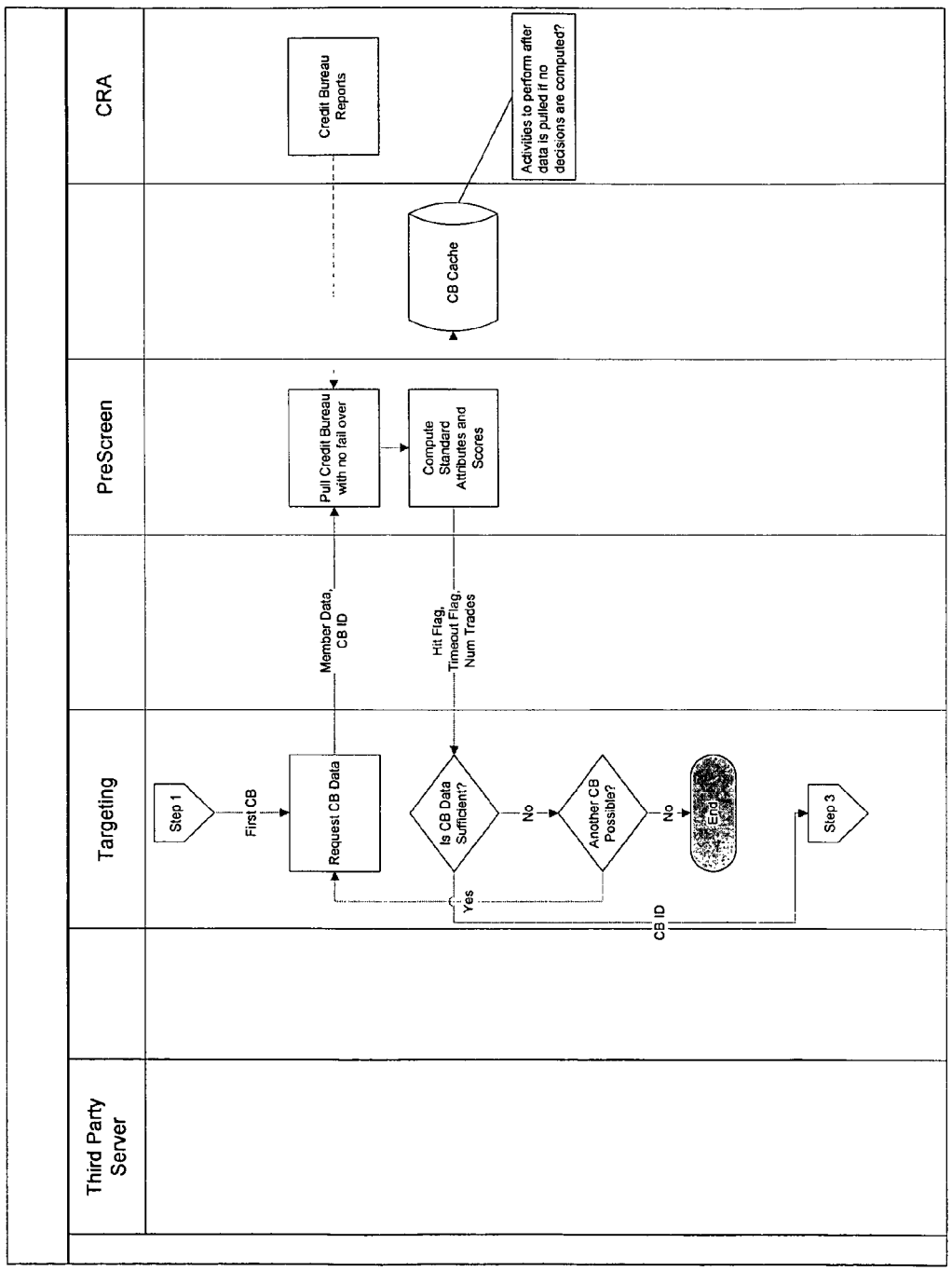
FIG. 15 is an activity diagram that shows a second step of the prescreen process, according to one embodiment of the invention.

FIG. 15 is an activity diagram that shows a second step of the prescreen process, according to one embodiment of the invention. "CRA" stands for "consumer reporting agency" (e.g., a credit bureau).

Figure 16:
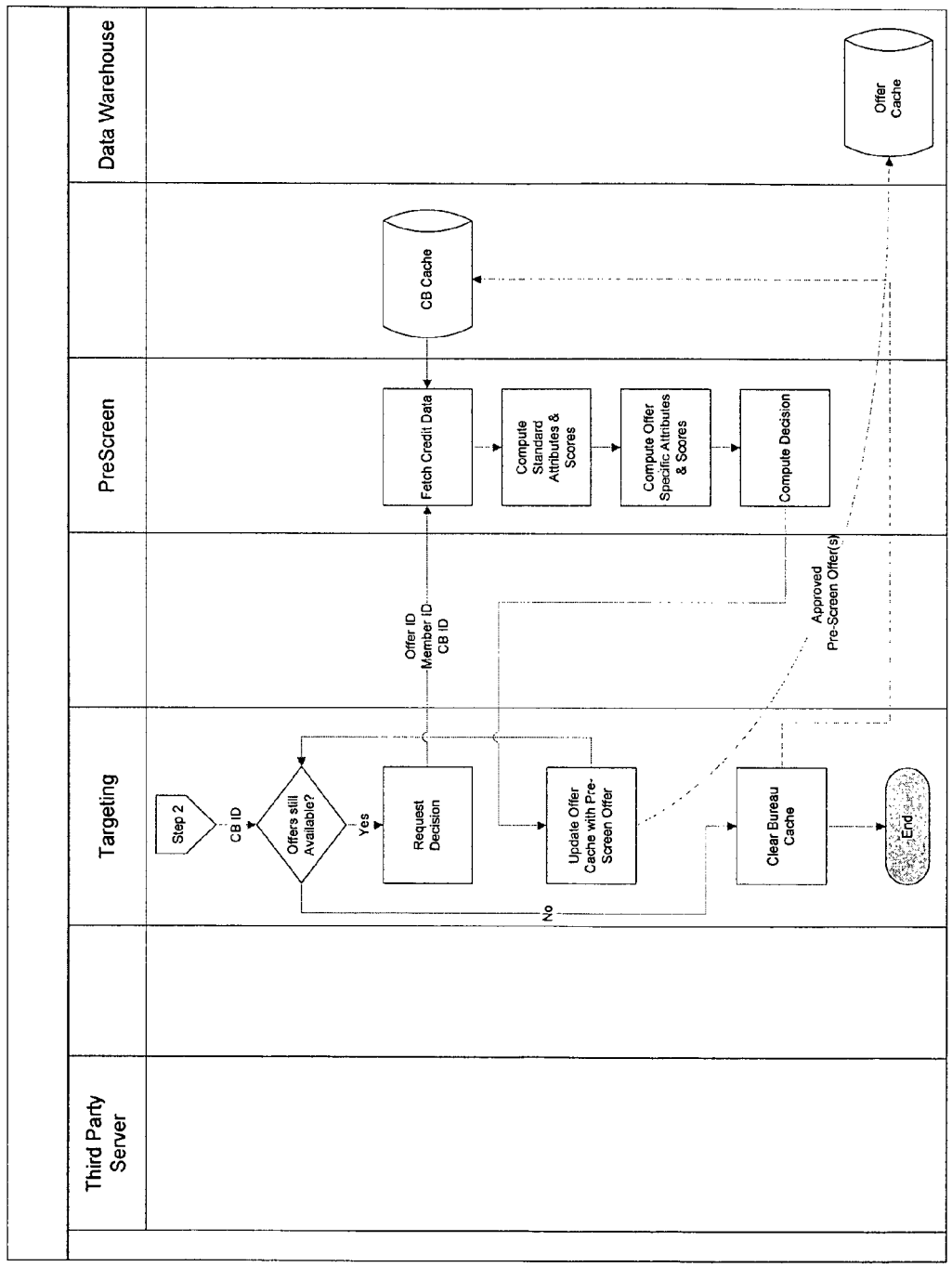
FIG. 16 is an activity diagram that shows a third step of the prescreen process, according to one embodiment of the invention.

FIG. 16 is an activity diagram that shows a third step of the prescreen process, according to one embodiment of the invention.

Figure 17:
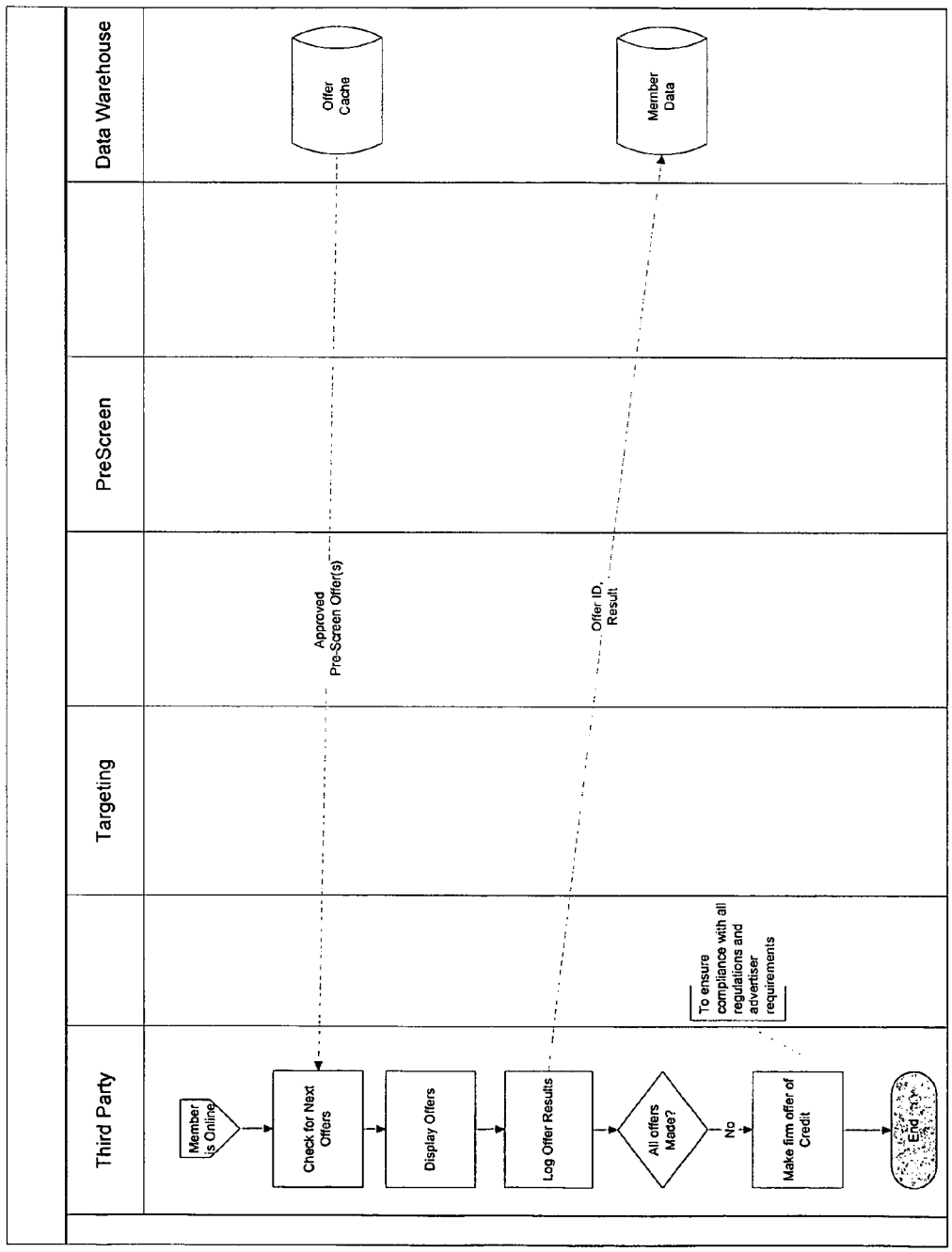
FIG. 17 is an activity diagram that shows a fourth step of the prescreen process, according to one embodiment of the invention.

FIG. 17 is an activity diagram that shows a fourth step of the prescreen process, according to one embodiment of the invention.

Figure 18:
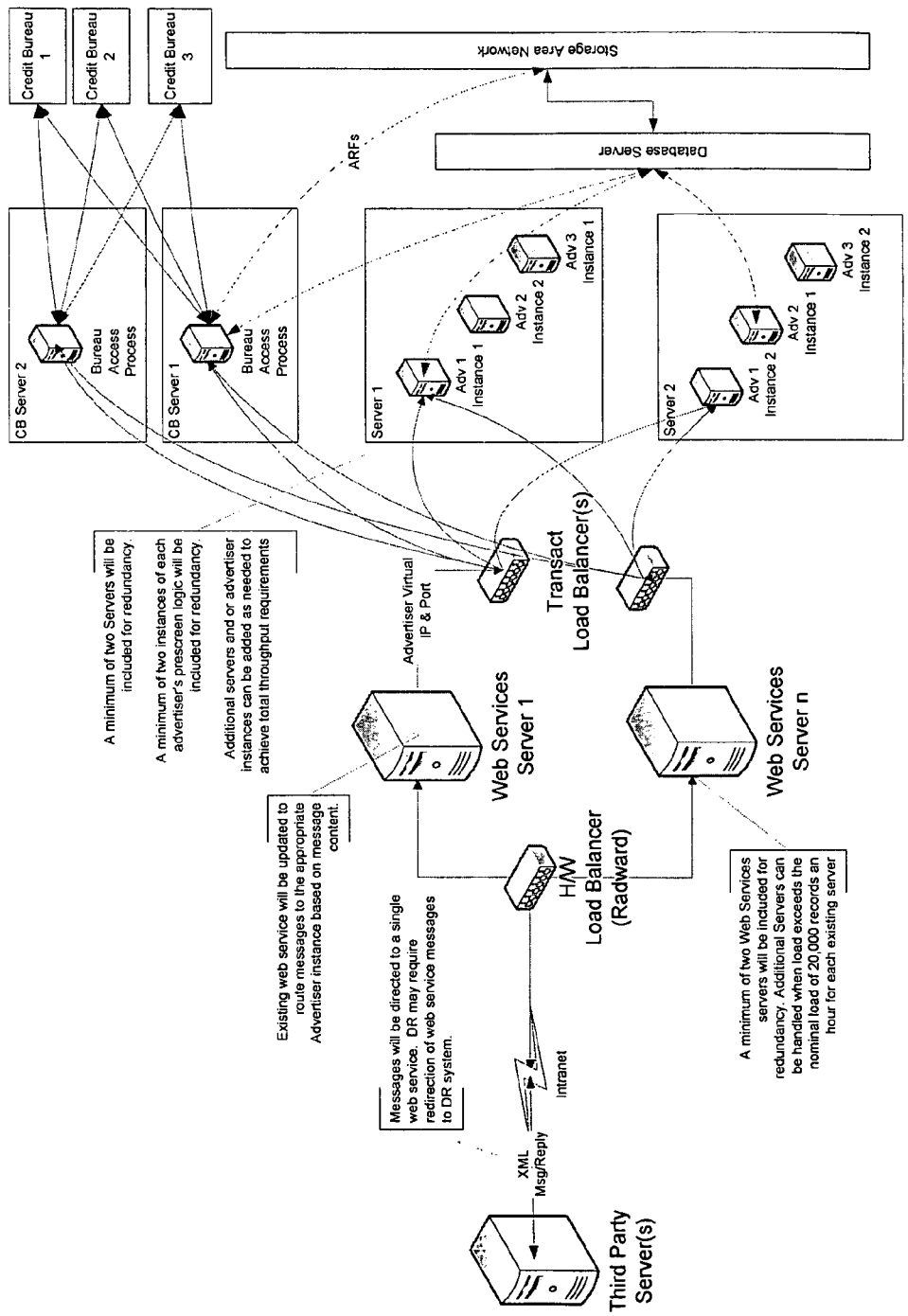
FIG. 18 is a block diagram of a system that includes a credit card marketing system, according to one embodiment of the invention.

FIG. 18 is a block diagram of a system that includes a credit card marketing system, according to one embodiment of the invention. "DR" stands for "disaster recovery."

Although the invention has been described in considerable detail with reference to certain embodiments thereof, other embodiments are possible as will be understood to those skilled in the art.

What is claimed is:

1. A method of providing prescreened credit card offers to a visitor of a website, the method comprising:
   receiving, by a computer, at least a name and address of a visitor of a website;
   determining, by the computer, a likelihood that the visitor will accept a prescreened credit card offer based on demographic data of the visitor;
   determining, by the computer, whether a prescreen of the visitor should be performed based at least on a likelihood that the visitor will accept a prescreened credit card offer, a cost per acquisition amount, and a cost for performing one or more prescreen operations;
   in response to determining that the prescreen should be performed:
      requesting, by the computer, performance of one or more prescreen operations to determine if the visitor qualifies for one or more prescreened credit card offers;
      receiving, by the computer, indications of one or more prescreened credit card offers, wherein the indications are determined by at least comparing credit data of the visitor to respective prescreening criteria for each of a plurality of credit cards;
      determining, by the computer, a profitability for each of the one or more prescreened credit card offers; and
      generating, by the computer, a user interface for viewing by the visitor comprising one or more of the prescreened credit card offers with the largest respective profitabilities.

2. The method of claim 1, wherein the cost per acquisition for a particular prescreened credit card comprises an amount of money that an owner of the website receives if the visitor applies for the particular prescreened credit card and is approved for receiving the particular prescreened credit card.

3. The method of claim 1, further comprising:
   receiving, by the computer, an indication from the visitor of a selected one of the prescreened credit card offers for which the visitor would like to apply; and
   transmitting, by the computer, information regarding the visitor, including the name and address of the visitor, to the respective issuer of the selected prescreened credit card offer.

4. The method of claim 3, further comprising:
   receiving, by the computer, information from the respective issuer of the selected prescreened credit card offer related to issuance of the selected prescreened credit card to the visitor.

5. The method of claim 1, wherein the credit data comprises one or more of: a value of major assets owned by the visitor, account balances of one or more credit accounts associated with the visitor, and information regarding requests by others for credit reports of the visitor.

6. A method of providing a prescreened credit card offer to a visitor of a website, the method comprising:
   determining, by a computer, if the visitor meets criteria for performing a prescreen on the visitor, the criteria comprising at least a likelihood that the visitor will accept a prescreened credit card offer, a cost per acquisition and a cost for performing one or more prescreen operations to determine if the visitor qualifies for one or more prescreened credit card offers;
   in response to determining that the visitor meets the criteria for performing a prescreen on the visitor:
      requesting, by the computer, performance of one or more prescreen operations to determine if the visitor qualifies for one or more prescreened credit card offers;
      receiving, by the computer, indications of one or more prescreened credit card offers, wherein the indications are determined by at least comparing credit data of the visitor to respective prescreening criteria for each of a plurality of credit cards;
      determining, by the computer, a profitability for each of the prescreened credit card offers;
      selecting, by the computer, a prescreened credit card offer having the largest profitability; and
      transmitting, by the computer, a user interface to a computing device used by the visitor, the user interface depicting information regarding the selected prescreened credit card offer.

7. The method of claim 6, further comprising:
selecting, by the computer, a second prescreened credit card offer having a second largest profitability; and
transmitting, by the computer, a user interface to the computing device used by the visitor, the user interface depicting information regarding the second prescreened credit card offer.

8. The method of claim 6, further comprising:
- determining, by the computer, a likelihood that the visitor will click on a link associated with a presented prescreened credit card offer;
- receiving, by the computer, indications of one or more prescreened credit card offers;
- determining, by the computer, a profitability for each of the prescreened credit card offers;
- selecting a prescreened credit card offer having the largest profitability; and
- transmitting, by the computer, the user interface to the computing device used by the visitor only if the likelihood that the visitor will click on a link associated with a presented prescreened credit card offer is greater than a predetermined threshold likelihood that the visitor will click on a link.

9. A computerized system of providing one or more prescreened credit card offers to a visitor of a website, the system comprising:
- a computing device configured to execute software code that performs:
  - receiving information regarding a visitor of a website;
    - determining whether a prescreen of the visitor should be performed based at least on a likelihood that the visitor will accept a prescreened credit card offer, a cost per acquisition amount, and a cost for performing one or more prescreen operations, wherein the likelihood that the visitor will accept a prescreened credit card offer is determined based on at least the received information regarding the visitor;
  - in response to determining that the prescreen should be performed:
    - requesting performance of one or more prescreen operations to determine if the visitor qualifies for one or more prescreened credit card offers;
    - receiving indications of one or more prescreened credit card offers, wherein the indications are determined by at least comparing credit data of the visitor to respective prescreening criteria for each of a plurality of credit cards;
    - determining a profitability for each of the one or more prescreened credit card offers;
    - selecting one or more prescreened credit card offers having respective profitabilities that are greater than a predetermined threshold profitability; and
    - transmitting information regarding at least some of the one or more selected prescreened credit card offers for display to the visitor.

10. The computerized system of claim 9, wherein information regarding a credit card offer having a highest profitability is displayed most prominently in the user interface.

11. A method of providing one or more prescreened credit card offers to a visitor of a website, the method comprising:
- determining whether a prescreen of the visitor should be performed based at least on a likelihood that the visitor will accept a prescreened credit card offer, a cost per acquisition amount and a cost for performing one or more prescreens;
- in response to determining that the prescreen should be performed:
  - requesting one or more prescreens to determine if the visitor qualifies for one or more prescreened credit card offers;
  - receiving indications of one or more prescreened credit card offers, wherein the indications are determined by at least comparing credit data of the visitor to respective prescreening criteria for each of a plurality of credit cards; and
  - transmitting, for display on a computing device used by the visitor, information regarding the one or more prescreened credit card offers,
- wherein the method is performed by a suitably configured computing system.

12. The method of claim 11, further comprising:
- transmitting, by the suitably configured computing system, information regarding the visitor, including a name and an address of the visitor, to a respective credit card issuer associated with the one or more prescreened credit card offers.

* * * * *